United States Patent [19]

Moradell et al.

[11] Patent Number: 5,483,853

[45] Date of Patent: Jan. 16, 1996

[54] SYSTEMS FOR ADJUSTING VEHICLE SEATS

[75] Inventors: Pierre G. R. Moradell, Saint Gregoire Du Vievre; Paul J. G. Jaudouin, Saint Georges Des Groseillers, both of France

[73] Assignee: Bertrand Faure France, Boulogne, France

[21] Appl. No.: 321,680

[22] Filed: Oct. 12, 1994

[30] Foreign Application Priority Data

Oct. 14, 1993 [FR] France .................... 93 12231

[51] Int. Cl.⁶ .................. B60N 2/12; B60N 2/18; B60N 2/20; F16C 1/02
[52] U.S. Cl. .................. 74/665 GD; 248/419; 248/429; 297/330; 297/362.11
[58] Field of Search .............. 74/665 GD, 665 F; 248/429, 419, 421; 297/330, 362.11, 362.14

[56] References Cited

U.S. PATENT DOCUMENTS

| | | | |
|---|---|---|---|
| 2,789,444 | 4/1957 | Winter et al. | 74/665 GD X |
| 2,939,513 | 6/1960 | Leslie et al. | 297/330 |
| 3,430,516 | 3/1969 | Pickles | 74/665 F |
| 4,264,849 | 4/1981 | Fleischer et al. | 297/330 X |
| 4,425,823 | 1/1984 | Kulischenko | 74/665 GD X |
| 5,103,691 | 4/1992 | Periou | 74/665 GD |

FOREIGN PATENT DOCUMENTS

| | | | |
|---|---|---|---|
| 1927567 | 12/1970 | Germany | 297/330 |
| 57-80932 | 5/1982 | Japan | 297/330 |

*Primary Examiner*—Charles A. Marmor
*Assistant Examiner*—Nathan O. Jensen
*Attorney, Agent, or Firm*—Larson and Taylor

[57] ABSTRACT

A system for adjusting a vehicle seat comprises a plurality of adjustment mechanisms that are selectively driven by a common adjustment electric motor via gear units that are distributed within the seat, each gear unit being in the vicinity of a corresponding adjustment mechanism, and being capable of being connected to the adjustment motor by at least one transmission member that rotates at the same speed as the adjustment motor, the system further including clutches and means for controlling the clutches. Each gear unit is permanently coupled to the adjustment motor via one of the transmission members, and is coupled to an adjustment mechanism via a clutch installed between the gear unit and the corresponding adjustment mechanism.

13 Claims, 5 Drawing Sheets

SYSTEMS FOR ADJUSTING VEHICLE SEATS

FIELD OF THE INVENTION

The invention relates to systems for adjusting vehicle seats, and in particular-the front seats of motor vehicles.

By way of example, the adjustments under consideration may be the longitudinal position of the seat, the length of the seat proper, the level and the inclination of the seat proper, the inclination of the back, and also the height and the inclination of the head rest.

More particularly, the invention relates to a system for adjusting a vehicle seat, the system comprising a plurality of adjustment mechanisms which are selectively driven by a common adjustment motor via gearing and clutches, the system further including means for controlling the clutches.

Such systems have the advantage of using a single motor for driving the various adjustments, thereby making it possible to reduce the cost of the system and to save weight.

BACKGROUND OF THE INVENTION

Presently known systems of that type nevertheless suffer from the drawback in that the rotary motion of the electric adjustment motor is transmitted to the adjustment mechanisms via a common reduction gear unit and via clutches that are all situated close to the adjustment electric motor, further gearing possibly being located close to each adjustment mechanism.

The members for transmitting rotary motion which are coupled between the clutches and the adjustment mechanisms (flexible shafts or other transmission members) rotate relatively slowly, so they have to transmit large amounts of torque, thereby requiring the use of transmission members that are strong, and therefore expensive, bulky, and relatively heavy.

Also, the additional gearing disposed close to each adjustment mechanism increases the total weight to the system.

Document FR-A-2 558 871 discloses a vehicle seat adjustment system of the kind in question, which avoids the above-mentioned drawback by providing gear units distributed about the seat, in the vicinity of each adjustment mechanism, with each gear unit being suitable for coupling to the adjustment motor via at least one transmission member rotating at the same speed as said adjustment motor.

The adjustment system disclosed in that document includes a clutch and selection mechanism between the adjustment motor and the transmission members that are respectively coupled to the gear units, for the purpose of selecting which adjustment mechanism is to be actuated.

That clutch and selection mechanism is complex and fragile.

OBJECT AND BRIEF SUMMARY OF THE INVENTION

A particular object of the present invention is to remedy that drawback.

To this end, according to the invention, a system of the kind in question has each gear unit permanently coupled to the adjustment motor by one of the transmission members, each gear unit being coupled to an adjustment mechanism via a corresponding one of the clutches which is installed between said gear unit and said adjustment mechanism.

In preferred embodiments, use is made of one or more of the following dispositions:

- at least some of the transmission members coupling the adjustment motor to the gear units are constituted by small-diameter flexible shafts; these flexible shafts are therefore lightweight, cheap, and capable of being curved round small radii of curvature, thereby enabling them to follow complex paths inside the structure of the seat and/or to curve in response to relative movements of certain portions of the seat structure, without taking up much room inside the seat;
- at least one of the gear units has an inlet rotary member which is permanently coupled to the adjustment motor via an inlet rotary member of another gear unit, thereby making it possible to minimize the length of the motion transmission members between the adjustment electric motor and the various adjustment mechanisms, and therefore minimizing total weight;
- each gear unit includes a rotary outlet member that has an axis of rotation, and each clutch includes a claw which is axially movable along the axis of rotation of the rotary outlet member of the gear unit to which the clutch can be coupled, the claw being capable of being placed in an axial coupling position where it is coupled to said rotary outlet member, the clutch also including a spring urging the claw towards its axial coupling position, and a slide that has a first axial end bearing against at least one fixed stop, and a second axial end against which a portion of the claw bears under urging from the spring, the first axial end of the slide including, for each fixed stop, a notch provided with at least one lateral ramp, the slide being rotated by a selector member and being capable of being placed in an angular coupling position in which each fixed stop coincides with a notch, thereby enabling the claw to be displaced axially into its axial coupling position under urging from the spring, the slide also being capable of displacing the claw axially away from its axial coupling position against the urging of the spring by co-operation between its at least one ramp and the corresponding fixed stop when the slide is moved away from its angular coupling position;
- the selector member slides in a circular slideway centered on the axis of rotation of the rotary outlet member of the gear unit, said selector member being connected to the slide via a sliding connection parallel to said axis of rotation;
- the selector members of the various clutches are secured to a common cable that forms a loop, said cable being displaceable between a plurality of predetermined positions, displacement of the cable between its predetermined positions causing the selector members and the slides to be displaced simultaneously, with each predetermined position of the cable corresponding to the angular coupling position of one of the slides;
- the cable is displaceable by sliding in a sheath;
- the cable is displaceable by a manually-actuatable control member, and the adjustment motor is controlled by an adjustment control device which is common to all of the adjustment mechanisms;
- the system includes an adjustment control device for each adjustment mechanism, and the cable is displaced by a selector electric motor as a function of which adjustment control device is actuated by a user;
- the selector electric motor rotates in a single direction of rotation, and said selector motor causes a crank to rotate which is connected to a lever via a sliding connection, said lever having a first end pivotally mounted on a fixed support and a second end secured to the cable, one full turn of the selector electric motor causing the cable to perform a back-and-forth motion, thereby causing-the cable to pass through each of its predetermined positions;

each adjustment control device includes at least one solenoid switch and at least one control switch which is connected in series with a cable position contact, said cable position contact being movable between a first position in which it connects said control switch to the selector electric motor, and a second position in which it connects said control switch to a solenoid of a solenoid switch, said cable position contact being in its second position when the cable is in its predetermined position where the slide of the clutch corresponding to the adjustment control device is in its annular coupling position, and the position contact of the cable being in its first position when the cable is not in said predetermined position, an electrical voltage being connectable across the control switch and the selector motor, and across said control switch and the solenoid, the solenoid switch being adapted to close when its solenoid is passing electrical current, the solenoid switch being connected, when closed, to apply voltage to the adjustment motor, a device for selecting the direction of rotation of the adjustment motor being interposed between the solenoid switch and the adjustment motor, said device for selecting the direction of rotation of the adjustment motor being controlled by the displacement of the control switches of the various adjustment control devices;

an electronic circuit controls motion of the selector motor and of the adjustment motor, said electronic circuit being connected to the adjustment control devices and to at least one cable position sensor, said electronic circuit being programmed so that when an adjustment control device is actuated by a user, it positions the cable in its predetermined position in which the adjustment mechanism corresponding to the actuated adjustment control device is coupled to the adjustment motor, and then actuates the adjustment electric motor for so long as the adjustment control device in question continues to be actuated by the user; and the system includes means for storing the positions of the various adjustment mechanisms and for causing seat adjustment to take up a position that has been stored, the system further including a position sensor for the adjustment motor, which sensor is connected to the electronic circuit.

BRIEF DESCRIPTION OF THE DRAWINGS

Other features and advantages of the invention appear from the following detailed description of various embodiments given by way of non-limiting example and with reference to the accompanying drawings.

In the drawings.

FIG.

In the various figures, the same references are used to designate elements that are identical or similar.

MORE DETAILED DESCRIPTION

Figure 1:
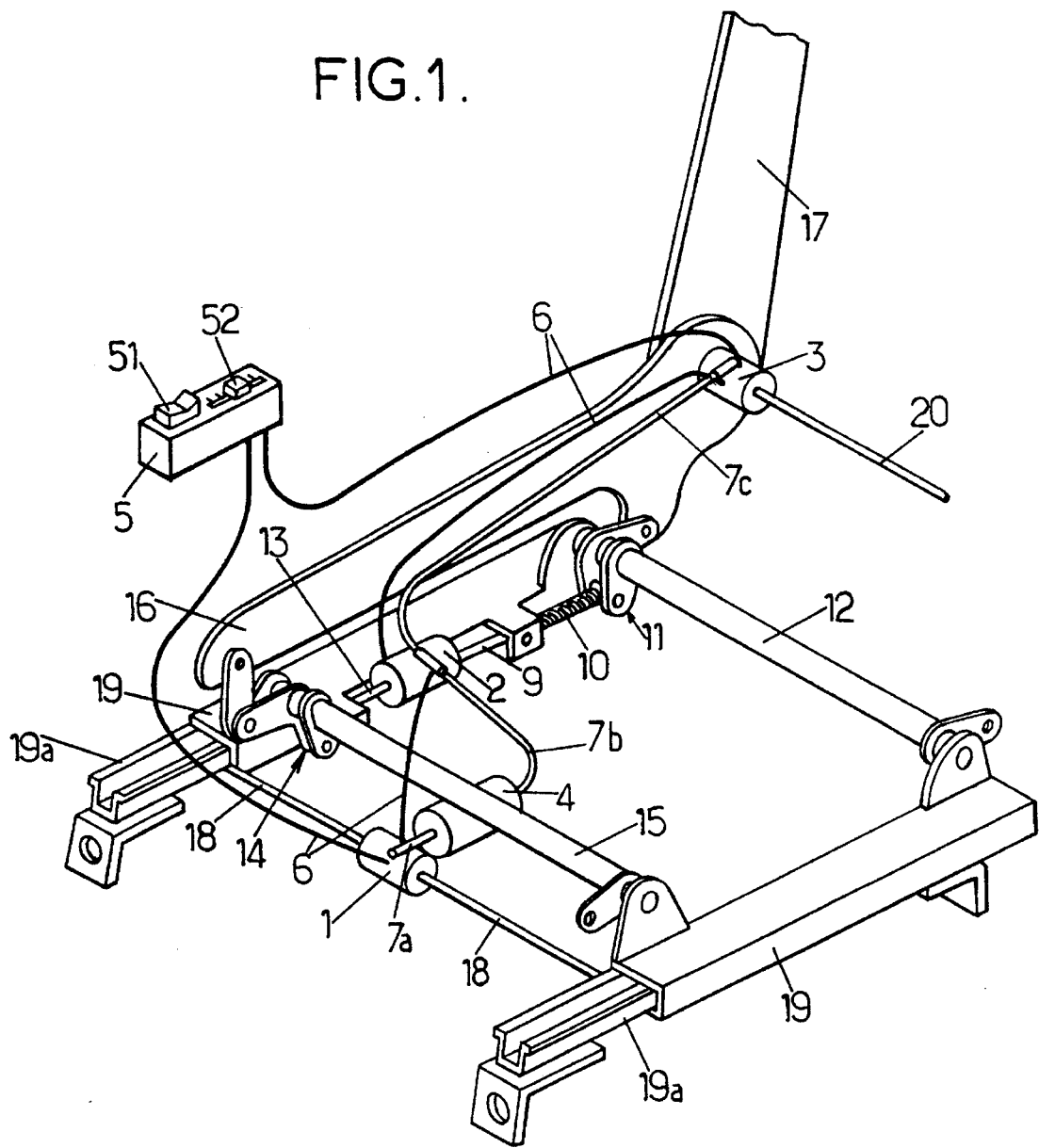
FIG. 1 is a diagrammatic perspective view of a car front seat provided with an adjustment system constituting a first embodiment of the invention, and provided with four seat adjustment mechanisms and a control boxer manual selection.
Figure 2:
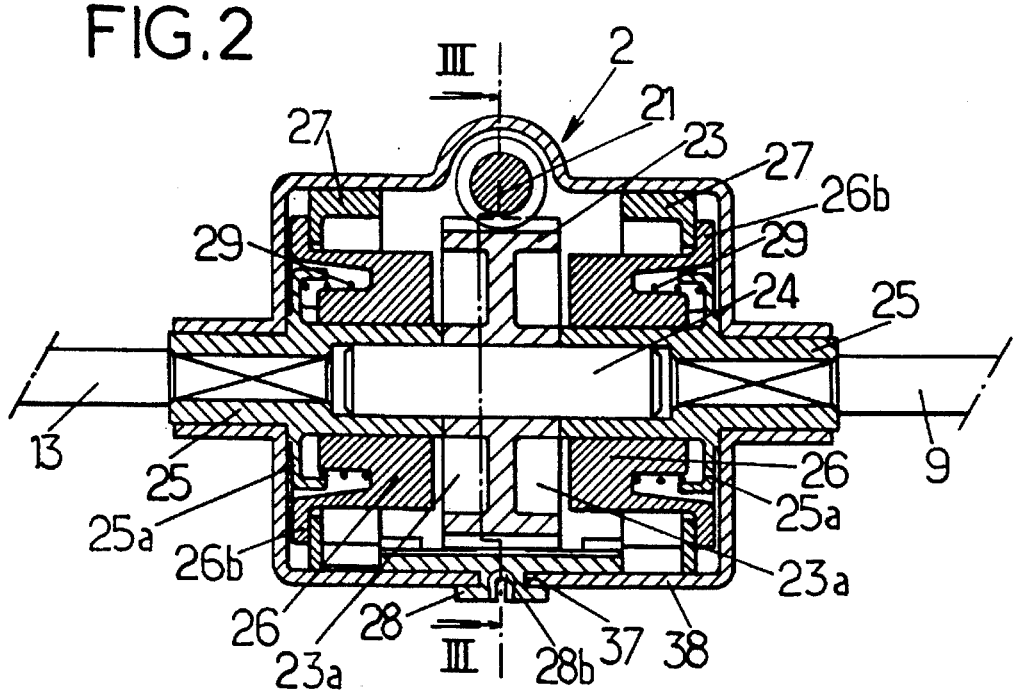
FIG. 2 is a section view through a gear and clutch housing of the FIG. 1 system, in the declutched position, the section being on line II—II of FIG. 3.
Figure 3:
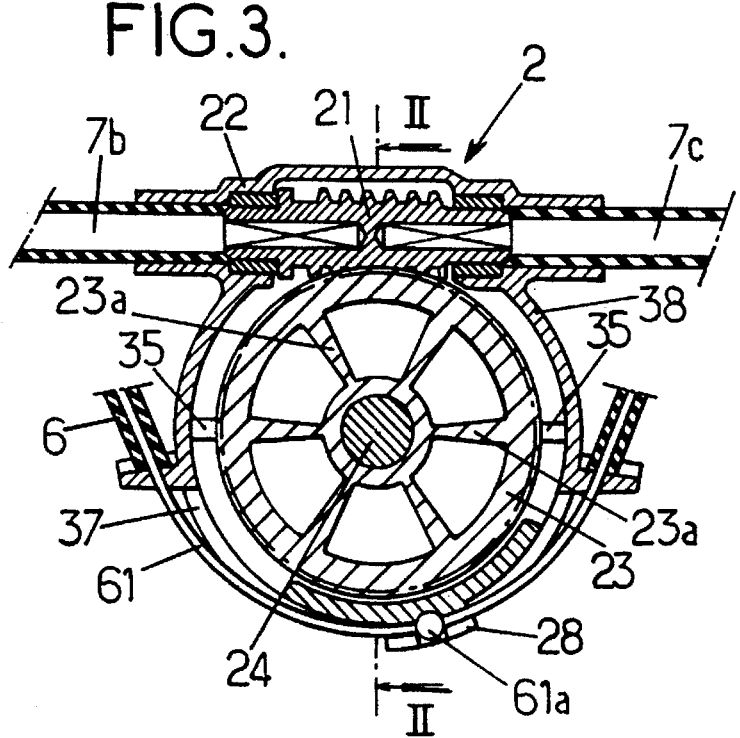
FIG. 3 is a section view on line III—III of FIG. 2.
Figure 4:
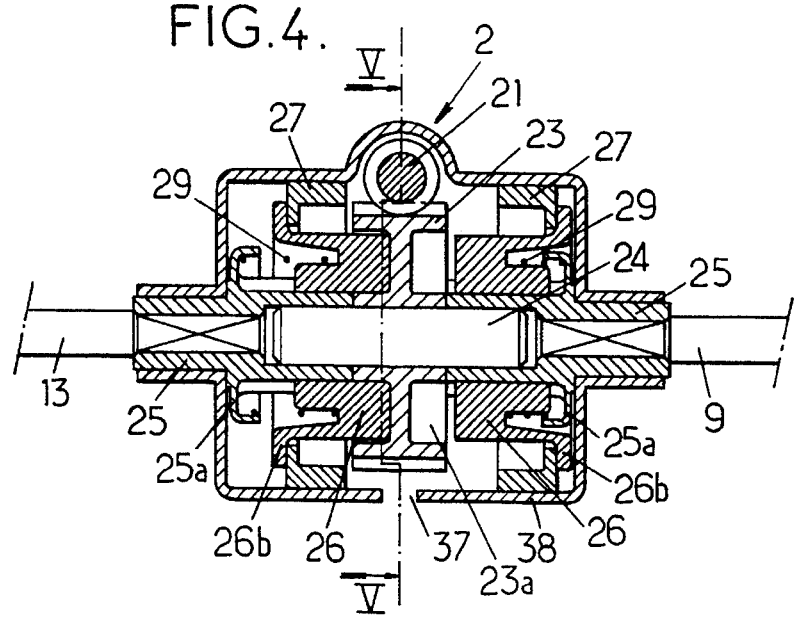
FIG. 4 is a section view through the housing of FIG. 2, with one of the clutches of the housing being in the coupled position, the section being taken on line IV—IV of FIG. 5.
Figure 5:
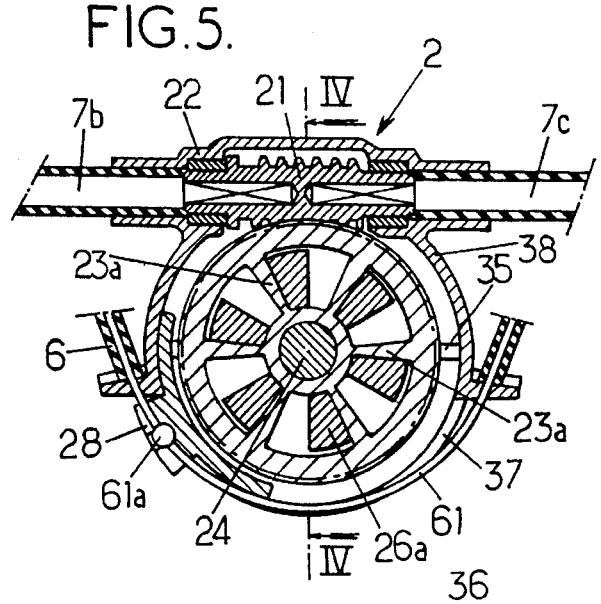
FIG. 5 is a section view on line V—V of FIG. 4.

FIG. 1 shows the structure of a vehicle front seat that is provided with an adjustment system of the invention, and that includes four adjustment mechanisms, namely:

a mechanism for adjusting the height of the front portion of the seat proper;

a mechanism for adjusting the height of the back portion of the seat proper;

a mechanism for adjusting the longitudinal position of the seat; and a mechanism for adjusting the inclination of the back.

The structure of the seat includes two seat side plates 16 and two back uprights 17, with only one of each of those items being shown in FIG. 1 for reasons of clarity.

In order to adjust the height of the front and back portions of the seat proper, each of the seat side plates 16 is carried by a back linkage 11 and by a front linkage 14.

By rotating the back linkages 11, it is possible to adjust the height of the rear portion of the seat proper, and by rotating the front linkages 14 it is possible to adjust the height of the front portion of the seat proper. It is thus possible to adjust not only the overall height of the seat proper but also its inclination.

The back linkage 11 corresponding to one of the seat side plates 16 is rotated under the control of a rod 10 having an outside thread that rotates in a nut secured to said linkage 11. In addition, a shaft 12 interconnects the two back linkages 11 corresponding to the two side plates, thereby synchronizing their movements.

The front linkages 14 are rotated in the same manner, with rotation of the two front linkages corresponding to the two side plates being synchronized by a shaft 15 which interconnects the said front linkages.

In order to adjust the longitudinal position of the seat, the front and back linkages are mounted on the floor of the vehicle via two slideways, each corresponding to a respective one of the side plates.

Each of these slideways comprises a slider 19 that slides longitudinally on a section bar 19a that is fixed to the floor of the vehicle, each slider 19 supporting one of the back linkages 11 and one of the front linkages 14.

Finally, to adjust the inclination of the seat back, each back upright is pivotally mounted on a corresponding side plate 16 via a hinge mechanism that is conventional in this application.

According to the invention, the vehicle seat is provided with an adjustment system comprising an adjustment electric motor 4 capable of rotating in both directions to drive the four above-mentioned adjustment mechanisms. The electric motor 4 is permanently coupled to three gear and clutch housings 1, 2, and 3, namely a first gear and clutch housing 1 for adjusting the longitudinal position of the seat; a second gear and clutch housing 2 for adjusting the front and back levels of the seat proper; and a third gear and clutch housing 3 for adjusting the inclination of the back.

The first gear and clutch housing 1 is coupled to the adjustment motor 4 via a first flexible shaft 7a, the second gear and clutch housing 2 is coupled to the adjustment motor 4 via a second flexible shaft 7b, and the third gear and clutch housing 3 is coupled to the motor 4 via a third flexible shaft 7c which is secured to the second flexible shaft 7b.

The flexible shafts 7a, 7b, and 7c rotate at the same speed as the adjustment motor 4, i.e. fast, such that the amount of torque they have to transmit is relatively small.

Thus, the flexible shafts 7a, 7b, and 7c may be of small diameter, e.g. less than 7 mm. In one particular embodiment, 4 mm shafts have been used with success.

Because of their small diameter, these flexible shafts are light in weight and can be curved around a small radius of curvature (e.g. a radius of curvature of 90 mm for a shaft having a diameter of 4 mm). The small radius of curvature makes it possible optionally for them to follow complex paths, and also makes it possible for the third shaft 7c to curve without difficulty as a function of the movements of the side plate 16 on which the third gear and clutch housing 3 is mounted.

Each of the gear and clutch housings 1, 2, and 3 has two drive shafts, which shafts may be rigid or flexible.

Thus, the first gear and clutch housing 1 has two drive shafts 18 which are mounted on the sliders 19 and each of which drives a mechanism of known type for causing the sliders 19 to move relative to the bars 19a.

The second gear and clutch housing 2 has two drive shafts 9 and 13 which are rotated independently of each other, as explained below. Drive shaft 9 rotates the rod 10 which controls the back linkage 11, while drive shaft 13 rotates the rod which controls the front linkage 14.

Finally, the third gear and clutch housing 3 includes two drive shafts 20 each serving to rotate the hinge mechanism of a respective one of the back uprights 17.

The three gear and clutch housings are controlled by a common cable 61 (not visible in FIG. 1) which is in the form of a loop. This cable slides in a sheath 6 and it is secured to a selector knob 52 on a control box 5. The knob 52 and the cable 61 can be moved to take up a plurality of predetermined positions for selectively controlling the various clutches of the gear and clutch housings 1, 2, and 3 in the manner described below.

In the example shown where the seat has four independent adjustment mechanisms, the selector knob 52 and the cable 61 have four predetermined positions, each enabling one of the adjustment mechanisms to be coupled to the adjustment motor.

Once the selection knob 52 has been placed in the desired position, then the user can perform adjustment by means of an adjustment control button 51 on the box 5, serving to cause the motor 4 to rotate in one direction or in the opposite direction.

The second gear and clutch housing 2 is described below in greater detail with reference to FIGS. 2 to 6.

The second gear and clutch housing 2 comprises a generally cylindrical case 38 having two outlet shafts 25 rotatably mounted therein, which outlet shafts are secured to the drive shafts 9 and 13 respectively.

The case 38 also contains a worm wheel 23 which is mounted to rotate about the same axis as the outlet shafts 25 via a hub 24 which is mounted free to rotate within the outlet shafts 25.

The worm wheel 23 meshes permanently with a worm screw 21 which is secured to the flexible shaft 7b rotated by the adjustment motor 4. Thus, when the adjustment motor 4 is caused to rotate, the worm wheel 23 is itself rotated by the flexible shaft 7b and the worm screw 21 with some predetermined stepdown ratio, the combination of worm screw 21 and worm wheel 23 constituting the gearing unit of the second gear and clutch housing 2.

In addition, the worm screw 21 of the housing 2 is also secured to the flexible shaft 7c which in turn drives another worm screw in the third gear and clutch housing 3.

The case 38 also contains, on either side of the worm wheel 23, respective claws 26, each of which is prevented from rotating about the corresponding outlet shaft 25, but is capable of being displaced axially towards or away from the worm wheel 23.

In the example shown, the worm wheel 23 includes radial ribs 23a on each of its axial faces, and each claw 26 has projections 26a capable of engaging between the ribs 23a when the claw 26 is moved close enough to the worm wheel 23, thereby defining an axial position in which the claw 26 is coupled. In this position, the corresponding outlet shaft 25 is coupled to the worm wheel 23 via the claw 26.

Each claw 26 is urged towards its axial coupling position by a respective helical spring 29 which is interposed between said claw 26 and a collar 25a on the corresponding outlet shaft 25.

In addition, each claw 26 includes an outwardly directed flange 26b which, under urging from the spring 29, bears against a ring-shaped slide 27.

Figure 6:
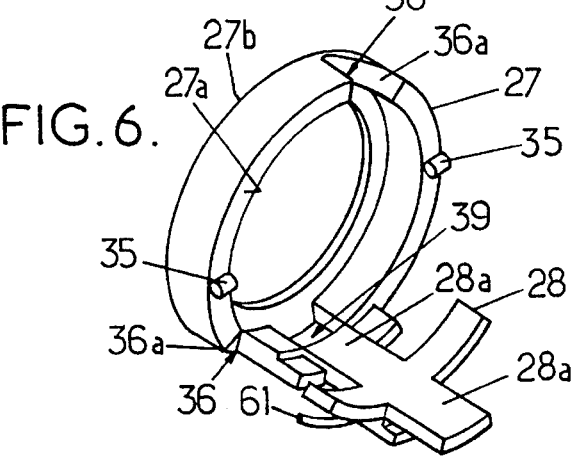
FIG. 6 is a perspective view of a detail showing the selection member at one of the slides of the housing of FIGS. 2 to 5.

As can be seen in FIG. 6, each slide 27 has a first axial face 27a and a second axial face 27b. The flange 26b of the claw bears against the second axial face 27b of the slide, while the first axial face 27a of the same slide bears against two diametrically opposite stops 35 secured to the case 38.

The first axial face 27a of the slide also includes two diametrically opposite notches 36, each of which has one or two cam-forming lateral ramps (there is only one ramp 36a per notch in the example shown in FIG. 6).

Thus, the two stops 35 and the two notches 36 define an angular coupling position of the slide 27 in which the stops 35 and the notches 36 coincide. In this position, the slide 27 can move towards the worm wheel 23 together with the corresponding claw 26 under urging from the spring 29. The claw 26 is thus brought into its axial coupling position. When the slide 27 is rotated away from its angular coupling position, it is moved away from the worm wheel 23 by the camming action of the ramps 36a on the stops 35, thereby causing the claw 26 itself to be pushed away from the worm wheel 23 so that it is no longer in its axial coupling position.

Finally, each slide 27 includes an axial slideway 39 which receives one of two axial fingers 28a of a selector member 28 slidably mounted in a circular slot 37 that is formed in the case 38 in a plane perpendicular to the axis of rotation of the worm wheel 23.

The selector member 28 is secured to the cable 61, e.g. by means of a bead 61a secured to the cable 61 and snapped into a recess 28b in the selector member 28.

Thus, any displacement of the cable 61 under drive from the selector knob 52 causes the selector member 28 to rotate by sliding in the slot 27, with this rotation being applied to the two slides 27 of the housing 2 via the axial fingers 28a. When the knob 52 and the cable 61 are in their predetermined position that corresponds to adjusting the level of the back of the seat proper, then the slide 27 situated at the same end as the drive shaft 9 is in its angular coupling position, thereby enabling the corresponding claw 26 to move into its axial coupling position, and thus causing the drive shaft 9 to be coupled to the worm wheel 23. In contrast, when the cable 61 is in this position, the slide 27 situated at the same end as the drive shaft 13 is not in its angular coupling position, so the drive shaft 13 is not coupled to the worm wheel 23.

Similarly, when the selector knob 52 and the cable 61 are in their predetermined position that corresponds to adjusting the level of the front of the seat, then the slide 27 situated at the same end as the drive shaft 13 is in its angular coupling position so that the corresponding claw 26 is free to be displaced into its axial coupling position by the spring 29, while the slide 27 situated at the same end as the drive shaft 9 is not in its angular coupling position so the corresponding claw 26 is not coupled to the worm wheel 23. Thus, the drive shaft 13 is coupled to the worm wheel 23 while the drive shaft 9 is not coupled to the worm wheel Since the selector knob and the cable 16 are displaceable longitudinally between two limit positions, the selector member 28 and the two slides 27 are likewise movable between two angular limit positions. When the angular coupling position of a slide 27 corresponds to one of these angular limit positions, as applies in the example of FIG. 6, then the notches 36 of the slide need have only one ramp 36a each. Otherwise, each notch 36 needs to have two lateral ramps 36a.

Figure 7:
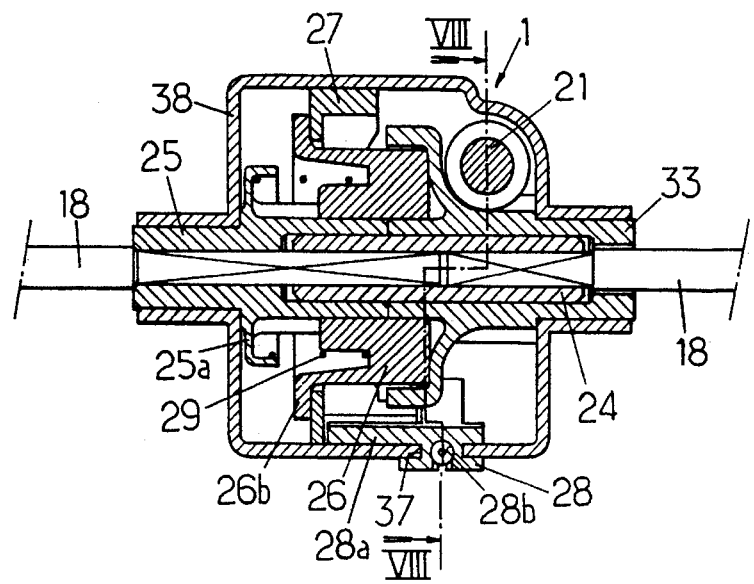
FIG. 7 is a section view through another clutch and gear housing of the FIG. 1 system, the clutch being in the coupled position and the section being taken on line VII—VII of FIG. 8.
Figure 8:
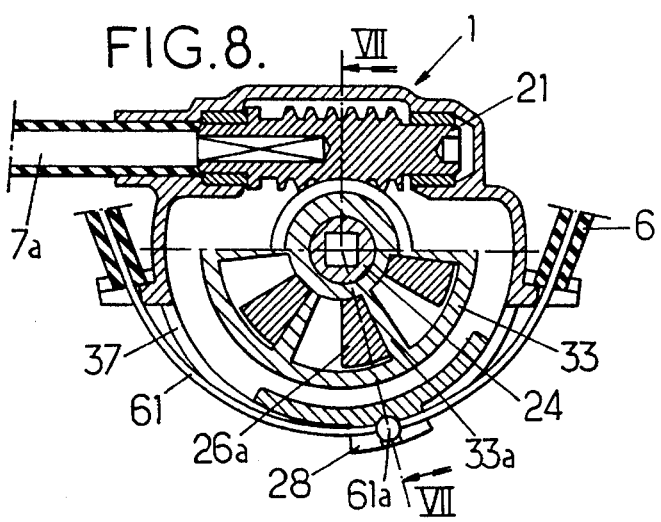
FIG. 8 is a section view on line VIII—VIII of FIG. 7.
Figure 9:
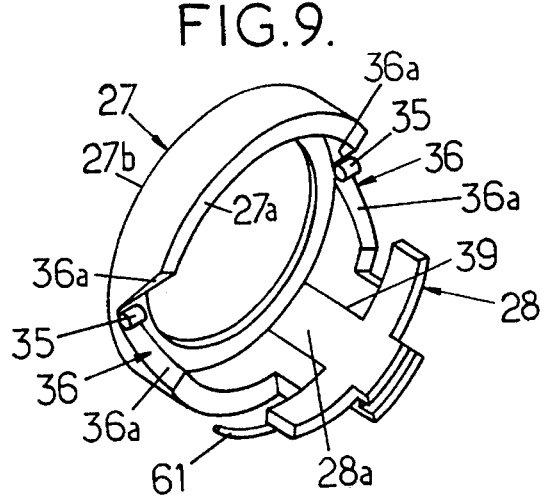
FIG. 9 s a perspective view of a detail showing the selection member and the slide of the housing of FIGS. 7 and 8.

FIGS. 7 to 9 show the first gear and clutch housing 1 which is not described in detail since it operates on the same principles as the second gear and clutch housing 2, but with the following differences:

the two drive shafts 18 are interconnected via the hub 24;

the gear and clutch housing has a single slide 27, a single claw 26, and a single spring 29, the selector member 28 has a single axial finger 28a, and the worm wheel 23 has radial ribs 33a on one of its axial faces only; and each notch 36 of the slide 31 has two ramps 36a in this case since the predetermined position of the cable 61 in which the slide 27 of the housing 1 is in its coupling position does not correspond, in this case, to a limit position for said cable 61.

Figure 10:
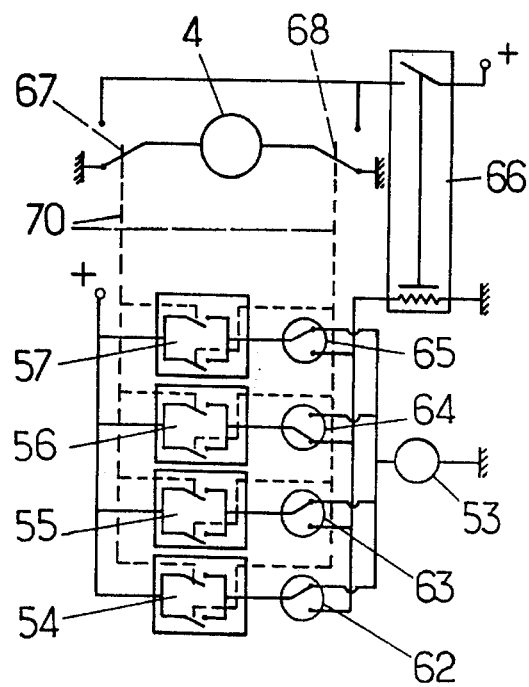
FIG. 10 is an electrical diagram for one variant of the system control box of FIG. 1.
Figure 11:
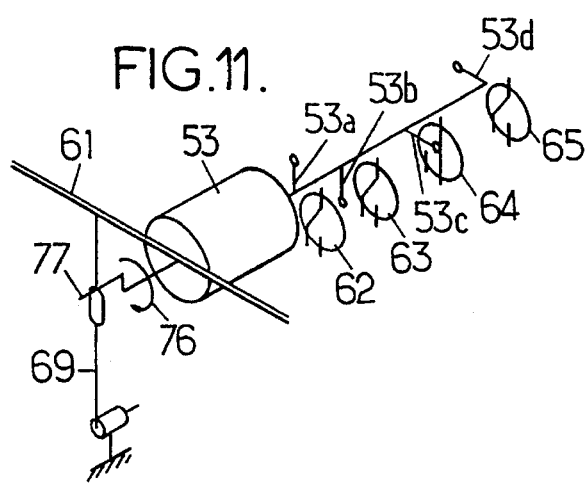
FIG. 11 is a diagram illustrating how the clutches of the system are controlled by a selector electric motor in the variant of FIG. 10.

FIGS. 10 and 11 show a variant control box for the adjustment system of the invention in which the cable 61 is moved between its various predetermined positions by a selector electric motor 53.

As shown in FIG. 11, the selector motor 53 drives a crank 77 in a single direction of rotation 76. The crank 77 is connected to a lever 69 via a sliding connection, a first end of the lever 69 being pivotally mounted about an axis that is parallel to the shaft of the selector motor 53, while a second end of the lever is secured to the cable 61.

Thus, one full turn of the selector motor 53 causes the cable 61 to move back and forth, thereby causing the cable 61 to pass through all of its predetermined positions, each of which corresponds to one of the seat adjustment mechanisms being driven.

In addition, the shaft of the selector motor 53 carries a set of cams 53a, 53b, 53c, and 53d each designed to interfere with an electrical position contact, respectively referenced 62, 63, 64, and 65. Each electrical position contact is movable between two positions, namely a first position that constitutes a rest position, and a second position in which the electrical contact is displaced resiliently by one of the cams 53a, 53b, 53c, and 53d on the shaft of the selector motor 53.

Optionally, the position of the shaft of the selector motor 53 or the position of the cable 61 could be identified by some other form of electrical, electro-magnetic, or electro-optical sensor selected from the numerous sensors known to the person skilled in the art.

As shown in FIG. 10, the control box 5 has four control buttons 54, 55, 56, and 57 corresponding respectively to the four adjustments that can be performed in this particular example.

Each of the adjustment buttons 54, 55, 56, and 57 controls two switches, each corresponding to a respective direction of rotation of the adjustment motor 4. Since the switches of the four control buttons 54, 55, 56, and 57 are wired identically, the description below relates specifically only to the wiring of the switches associated with control button 54.

The two switches corresponding to the control button 54 are connected in parallel, and the set of the two switches is connected in series with the electrical position contact 62. When the electrical position contact 62 is in its first position, i.e. when the cable 61 is not in its predetermined position that enables the adjustment corresponding to the button 54 to be performed, then the electrical contact 62 connects the switches of the button 54 to the selector electric motor 53.

In addition, an electrical voltage is applied across the switches of the control button 54 and the selector motor 53. Thus, when a user presses on the button 54 in one direction or the other, then one or the other of the switches of the button 54 is closed, and the selector motor 53 rotates in its direction of rotation 76 until the cam 53a displaces the electrical contact 62 from its first position to its second position. The cable 61 is then in its predetermined position enabling the adjustment to be performed that corresponds to the button 54.

When the electrical contact 62 is in its second position, the switches corresponding to control button 54 are connected to the solenoid of a solenoid switch 66 with the above-mentioned electrical voltage being applied across said switches and said solenoid.

Current thus flows through the solenoid, thereby causing the solenoid switch 66 to close and thus applying voltage to the adjustment electric motor 4 (in this case a positive DC voltage) via a system for selecting the direction of rotation of the adjustment motor 4 which system is mechanically controlled by the displacement of the button 54 via mechanical links 70.

In the example shown in FIG. 10, the direction-selector system has two changeover contacts 67 and 68 which are mechanically connected to respective ones of the two switches of the control button 54, which contacts are connected to ground when the corresponding switch is opened, and when the corresponding switch is closed they are connected to the positive DC via the solenoid switch 66.

Figure 12:
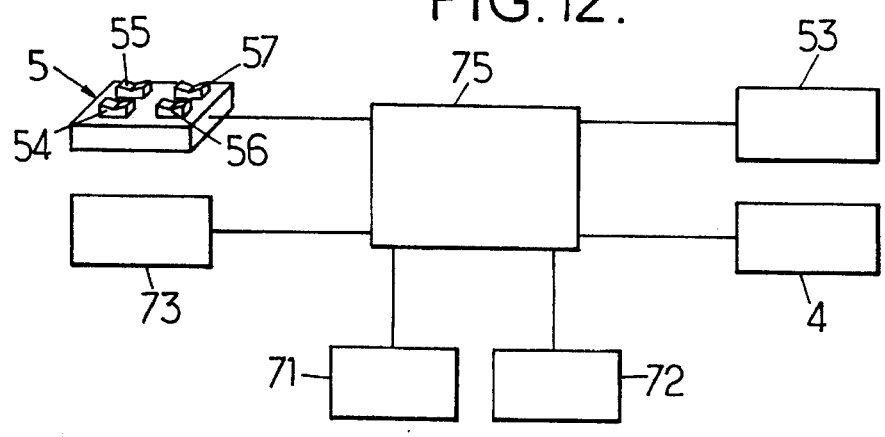
FIG. 12 is a block diagram showing another variant of the control box for the system of the invention.

In a second variant, shown in FIG. 12, the control box 5 still has four control buttons 54, 55, 56, and 57 that are identical to those in the variant of FIGS. 10 and 11, however in this case the control buttons are connected to an electronic control circuit 75 (generally an integrated circuit) which controls the adjustment motor 4 and the selector motor 53, and which receives data coming from a sensor 71 indicating the angular position of the selector motor 53. The sensor 71 may optionally comprise a set of cams 53a, 53b, 53c, and 53d associated with on/off electrical contacts, as in the example of FIG. 11, or else the sensor 71 may be of any other type selected from sensors known to the person skilled in the art.

The electronic circuit 75 is programmed to operate in a manner similar to the electrical circuit of FIG. 10.

In addition, the electronic circuit 75 receives data from a sensor 72 which indicates the angular position of the shaft of the adjustment motor 4, and the system includes a memory keypad 73 which makes it possible to have various different seat adjustments stored in the electronic circuit 75 at the press of a button, and subsequently to cause the seat to return automatically to the stored adjustments.

Naturally, the invention is not limited to the embodiment described. In particular, the coupling between the claw 26 and the worm wheel 23 in each of the gear and clutch housings could optionally be obtained by friction, by electromagnetic means, or in some other way.

We claim:

1. A system for adjusting a vehicle seat, the system comprising a plurality of adjustment mechanisms that are selectively driven by a common adjustment electric motor via gear units that are distributed about the seat each respectively in the vicinity of a corresponding one of the adjustment mechanisms, the gear mechanisms being connectable to the adjustment motor via at least one transmission member rotating at the same speed as said adjustment motor, the system further including clutches and clutch control means, wherein each gear unit is permanently coupled to the adjustment motor by one of the transmission members, each gear unit being coupled to an adjustment mechanism via a corresponding one of the clutches which is installed between said gear unit and said adjustment mechanism.

2. A system according to claim 1, in which at least some of the transmission members coupling the adjustment motor to the gear units are constituted by small diameter flexible shafts.

3. A system according to claim 1, in which each gear unit has a rotary inlet member, the rotary inlet member of at least one of the gear units being permanently coupled to the adjustment motor via the rotary inlet member of another one of the gear units.

4. A system according to claim 1, in which each gear unit includes a rotary outlet member that has an axis of rotation, and each clutch includes a claw which is axially movable along the axis of rotation of the rotary outlet member of the gear unit to which the clutch can be coupled, the claw being capable of being placed in an axial coupling position where it is coupled to said rotary outlet member, the clutch also including a spring urging the claw towards its axial coupling position, and a slide that has a first axial end bearing against at least one fixed stop, and a second axial end against which a portion of the claw bears under urging from the spring, the first axial end of the slide including, for each fixed stop, a notch provided with at least one lateral ramp, the slide being rotated by a selector member and being capable of being placed in an angular coupling position in which each fixed stop coincides with a notch, thereby enabling the claw to be displaced axially into its axial coupling position under urging from the spring, the slide also being capable of displacing the claw axially away from its axial coupling position against the urging of the spring by co-operation between its at least one ramp and the corresponding fixed stop when the slide is moved away from its angular coupling position.

5. A system according to claim 4, in which the selector member slides in a circular slideway centered on the axis of rotation of the rotary outlet member of the gear unit, said selector member being connected to the slide via a sliding connection parallel to said axis of rotation.

6. A system according to claim 4, in which the selector members of the various clutches are secured to a common cable that forms a loop, said cable being displaceable between a plurality of predetermined positions, displacement of the cable between its predetermined positions causing the selector members and the slides to be displaced simultaneously, with each predetermined position of the cable corresponding to the angular coupling position of one of the slides.

7. A system according to claim 6, in which the cable is displaceable by sliding in a sheath.

8. A system according to claim 6, in which the cable is displaceable by a manually-actuatable control member, and the adjustment motor is controlled by an adjustment control device which is common to all of the adjustment mechanisms.

9. A system according to claim 6, including an adjustment control device for each adjustment mechanism, and in which the cable is displaced by a selector electric motor as a function of which adjustment control device is actuated by a user.

10. A system according to claim 9, in which the selector electric motor rotates in a single direction of rotation, and said selector motor causes a crank to rotate which is connected to a lever via a sliding connection, said lever having a first end pivotally mounted on a fixed support and a second end secured to the cable, one full turn of the selector electric motor causing the cable to perform a back-and-forth motion, thereby causing the cable to pass through each of its predetermined positions.

11. A system according to claim 9, in which each adjustment control device includes at least one solenoid switch and at least one control switch which is connected in series with a cable position contact, said cable position contact being movable between a first position in which it connects said control switch to the selector electric motor, and a second position in which it connects said control switch to a solenoid of a solenoid switch, said cable position contact being in its second position when the cable is in its predetermined position where the slide of the clutch corresponding to the adjustment control device is in its annular coupling position, and the position contact of the cable being in its first position when the cable is not in said predetermined position, an electrical voltage being connectable across the control switch and the selector motor, and across said control switch and the solenoid, the solenoid switch being adapted to close when its solenoid is passing electrical current, the solenoid switch being connected, when closed, to apply voltage to the adjustment motor, a device for selecting the direction of rotation of the adjustment motor being interposed between the solenoid switch and the adjustment motor, said device for selecting the direction of rotation of the adjustment motor being controlled by the displacement of the control switches of the various adjustment control devices.

12. A system according to claim 9, including an electronic circuit that controls motion of the selector motor and of the adjustment motor, said electronic circuit being connected to the adjustment control devices and to at least one cable position sensor, said electronic circuit being programmed so that when an adjustment control device is actuated by a user, it positions the cable in its predetermined position in which the adjustment mechanism corresponding to the actuated adjustment control device is coupled to the adjustment motor, and then actuates the adjustment electric motor for so long as the adjustment control device in question continues to be actuated by the user.

13. A system according to claim 12, including means for storing the positions of the various adjustment mechanisms and for causing seat adjustment to take up a position that has been stored, the system further including a position sensor for the adjustment motor, which sensor is connected to the electronic circuit.

* * * * *